June 1, 1948.    F. A. BLASI    2,442,483
NOVEL SPECTACLE FRAME
Filed Oct. 11, 1947
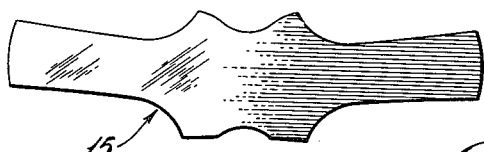
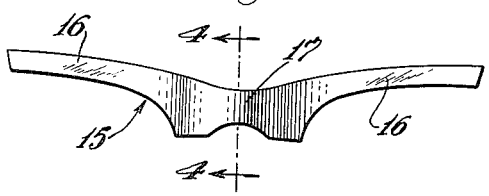
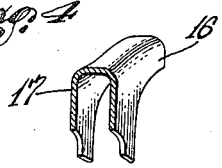
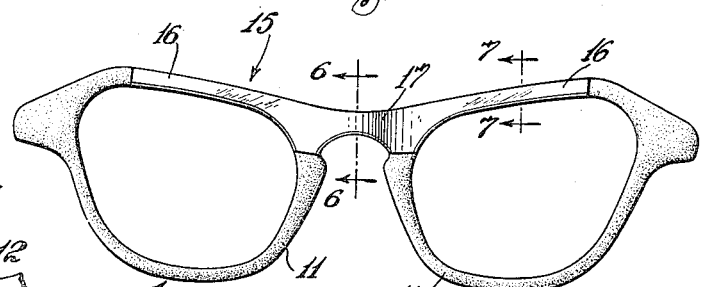
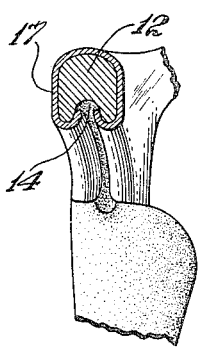
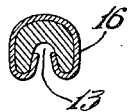
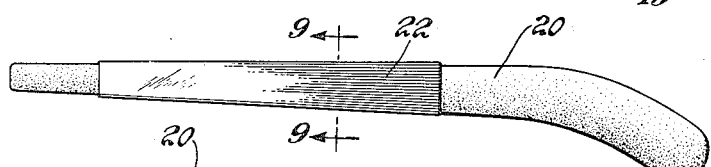
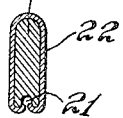
INVENTOR.
Frank A. Blasi
BY Angelo M. Pisarra
ATTORNEY Patented June 1, 1948

2,442,483

UNITED STATES PATENT OFFICE 2,442,483

NOVEL SPECTACLE FRAME

Frank A. Blasi, Newark, N. J.

Application October 11, 1947, Serial No. 779,242

2 Claims. (Cl. 41—34)

This invention relates to novel spectacle frames, parts thereof and to methods for making them.

The most popular spectacle frames of the present time comprise a single element, generally composed of a plastic composition and consisting of a pair of lens rims of various shapes and designs connected together by means of a saddle or keystone bridge. Hingedly connected to the rims are temples of various shapes and designs.

Prior to this invention it has been proposed to provide the bridge as well as the upper lengths of the rims with a thin layer of metal such as gold or the like for the purpose of making the frame of more attractive design. This is usually accomplished by first depositing a layer of electrical-conducting material on to the surface to be coated and then immersing into an electrolyte and electrodepositing a thin base layer thereon. This electrodeposited layer is then buffed and then the frame is immersed in another electrolyte and a thin layer of gold is deposited on the base layer. In some cases more than one base layer is electrodeposited before the gold layer is deposited. In any case, it has been found that spectacle frames having the thin electrodeposited metals thereon have not been satisfactory because either due to the electrolytes or due to the buffing or both adversely affecting the plastic material, the frames are mechanically weakened at the places where the electrodeposited material is located, and in addition the plating itself cracks and sometimes peels off of the plastic frame when the frame is deformed in the course of lens insertion.

The primary purpose of this invention is to provide spectacle frames and parts thereof with covers of attractive design without weakening the frames or parts thereof and eliminating possibility of cover cracking or peeling. Another object of this invention is to provide a novel method for coupling a cover element with a spectacle frame and parts thereof.

These as well as other objects and advantages of the invention will be readily apparent from the following description and drawings wherein, Fig. 1 is a top plan view of a cut-out blank which is to serve as a cover.

Fig. 2 is a side view of the blank of Fig. 1 after it has been folded over and before coupling with a spectacle frame.

Fig. 3 is a top plan view of the folded over blank shown in Fig. 2.

Fig. 4 is a cross sectional view taken on line 4—4 of Fig. 2.

Fig. 5 is a front view of a spectacle frame embodying the invention.

Fig. 6 is a cross sectional view taken on line 6—6 of Fig. 5.

Fig. 7 is a cross sectional view taken on line 7—7 of Fig. 5.

Fig. 8 is a side view of a temple embodying the invention.

Fig. 9 is a cross sectional view taken on line 9—9 of Fig. 8.

As shown in the drawings, the novel spectacle frame 10 consists of a single unitary assembly of a pair of lens rims 11 connected together by a bridge 12. The frame 10 is preferably composed of a plastic composition. Each of the rims 11 has an inner groove or slot 13 extending the entire length thereof.

According to this invention the bridge 12 also has a narrow slot or groove 14 along the length of the bottom face thereof. An attractive design imparting and reinforcing cover plate 15 is coupled with the spectacle frame 10. The plate 15 may be a thin multiple layer element whose outer surface is of gold or other precious metal. The plate 15 which is relatively soft for working but is rigid and non-cracking on deformation, is first cut out to provide a blank of appropriate design as that shown in Fig. 1. The blank 15 may be folded over and shaped on a suitable form to provide the element shown in Figs. 2 and 3 and being of U-shape in cross section as shown in Fig. 4 and is characterized by a pair of oppositely extending channels 16 and a central channel 17. The cover plate 15 is placed over the upper length of the frame 10, with the central channel 17 at the bridge and the channels 16 along the upper parts of the rims 11. The side of the channels 16 are bent over the rims 11 and their edges are located in the grooves 13 as shown in Fig. 7. The edges of the central portion 17 of cover 15 are likewise bent inwardly and are located in the groove 14 of the bridge as shown in Fig. 6. With this construction, the frame may be rendered attractive without weakening it mechanically but contrarily the frame is rendered very sturdy. The metal sheath 15 closely hugs or clasps the frame at the bridge and also along the upper reaches of the rims 11 so that even if the frame is subjected to rough usage, it will withstand breakage at the parts clad thereby. Hingedly secured to the frame 10 at the ends thereof are temples 20. The underface of each temple 20 may have an elongated narrow groove 21 therein and a cover plate 22 may be placed thereover, with its edges folded over and locked into said groove. The frames of this invention may be roughly handled without danger of breakage at the clad portions thereof when lens are located in the rims, with the edges thereof located in the grooves 13 of the rims 11.

The frame 10 and the temple 20 are respectively reenforced by the rigid plates 15 and 22 whose ends are folded over into the respective grooves (13 and 14) of the frame and 21 of the temples whereby the plates 15 and 22 are clinched and anchored to the respective frame 10 and temple 22.

I claim:

1. A spectacle frame comprising a pair of rims, a bridge connecting said rims, each of said rims having an inner groove therein, said bridge having a groove in the bottom face thereof, a metal cover extending along the upper length of said frame and covering the top, front and rear sides of said bridge and at least a portion of the top, front and rear sides of said rims, edges of said cover located in the grooves of said rims and said bridge.

2. A spectacle frame comprising a pair of rims, a bridge connecting said rims, each of said rims having an inner groove therein, said bridge having a groove in the bottom face thereof, a metal cover plate of approximately U-shape in cross section mounted on the upper part of said frame and covering the top, front and rear sides of said bridge, the top, front and rear sides of at least a part of each of said rims, the lower part of said cover plate folded over, with edges thereof located in said grooves of said rims and bridge.

FRANK A. BLASI.

REFERENCES CITED

The following references are of record in the file of this patent:

UNITED STATES PATENTS

| Number | Name | Date |
| --- | --- | --- |
| 373,006 | Bradley | Nov. 8, 1887 |
| 1,189,882 | Sommer | July 4, 1916 |
| 1,269,383 | Cady | June 11, 1918 |
| 1,440,430 | Wrighton | Jan. 2, 1923 |
| 1,557,322 | Peck | Oct. 13, 1925 |
| 1,996,183 | Walters | Apr. 2, 1935 |
| 2,041,004 | Levan | May 19, 1936 |
| D. 147,368 | Levoy | Aug. 26, 1947 |

FOREIGN PATENTS

| Number | Country | Date |
| --- | --- | --- |
| 366,740 | Great Britain | Feb. 11, 1932 |
| 407,256 | Great Britain | Mar. 15, 1934 |
| 500,244 | Great Britain | Feb. 6, 1939 |
| 624,380 | France | Apr. 2, 1937 |